United States Patent

Saito

Patent Number: 5,966,455
Date of Patent: Oct. 12, 1999

[54] IMAGE PROCESSING APPARATUS AND METHOD

[75] Inventor: Kazuyuki Saito, Machida, Japan

[73] Assignee: Canon Kabushiki Kaisha, Tokyo, Japan

[21] Appl. No.: 08/501,562

[22] Filed: Jul. 12, 1995

[30] Foreign Application Priority Data

Jul. 13, 1994 [JP] Japan .................................. 6-160901
Jul. 20, 1994 [JP] Japan .................................. 6-167748

[51] Int. Cl.⁶ ........................................................ G06K 9/00
[52] U.S. Cl. ................................................. 382/112; 707/517
[58] Field of Search ....................................... 348/129, 126; 382/256, 257, 173–180, 112, 113, 190, 194, 292; 395/118; 358/453; 199/38–42; 707/500, 513, 515–521, 900, 908

[56] References Cited

U.S. PATENT DOCUMENTS

| | | | |
|---|---|---|---|
| 4,484,081 | 11/1984 | Cornyn, Jr. et al. | 250/563 |
| 4,788,538 | 11/1988 | Klein et al. | 340/747 |
| 5,301,248 | 4/1994 | Takanori et al. | 382/141 |
| 5,757,957 | 5/1998 | Tachikawa et al. | 382/176 |

FOREIGN PATENT DOCUMENTS

| | | | |
|---|---|---|---|
| 0496531 | 7/1992 | European Pat. Off. | G06K 9/32 |
| 0587450 | 3/1994 | European Pat. Off. | G06K 9/20 |
| 64-15889 | 1/1989 | Japan . | |

OTHER PUBLICATIONS

Proceedings of the International Conference On Pattern Recognition, Atlantic City, New Jersey, Jun. 16–21, 1990, Conference A: Computer Vision and Conference B: Pattern Recognition Systems and Applications, vol. 1, Jun. 16, 1990, Institute of Electrical and Electronics Engineers, pp. 551–556, Shuichi Tsujimoto, et al., "Understanding Multi–Articled Documents", p. 554, Section "3.3 Virtual field separators for universal transformations".

Computer, vol. 25, No. 7, Jul. 1, 1992, pp. 67–71, "DRS: A Workstation–Based Document Recognition System for Text Entry", p. 69, Section "Page structure analysis".

Primary Examiner—Jon Chang
Assistant Examiner—Jayanti K. Patel
Attorney, Agent, or Firm—Fitzpatrick, Cella, Harper & Scinto

[57] ABSTRACT

An image processing apparatus which detects dotted/broken-line separator between image areas in input data. In an area divider 105 which divides image data inputted from an input unit 101 into a plurality of image areas, a labeling unit 106 which generates block areas each containing one or plural connected black pixels; a dotted/broken-line factor extractor 108 extracts block areas having a block area size smaller than a predetermined size, as candidates for dotted/broken-line separator block areas; a block area combiner combines one candidate block area with another candidate block area within a predetermined distance; and a dotted/broken-line separator detector 110 determines whether each combination of candidate block areas satisfies a shape as a separator factor between image areas. Thus, a dotted/broken-line separator between image areas can be correctly detected.

13 Claims, 18 Drawing Sheets

FIG. 5

| BLOCK LABEL | ATTRIBUTE |
|---|---|
| POSITIVE INTEGER | DOCUMENT |
| 0 | INVALID |
| -1 | UNUSED |
| -2 | UNUSED |
| -3 | SEPARATOR |
| -4 | TABLE |
| -5 | FIGURE / PICTURE |
| -6 | DOTTED / BROKEN-LINE SEPARATOR |

* IF W ≥ Tw4 AND H ≥ Tw4 AND D ≥ Td5 HOLD, FIGURE / PICTURE

IMAGE PROCESSING APPARATUS AND METHOD

BACKGROUND OF THE INVENTION

The present invention relates to an image processing apparatus and method applied to image processing devices such as an OCR (optical character recognition) device, a copying machine and a facsimile, for dividing an input image into image areas such as document areas, figure (geometric structure) areas and table areas.

Conventionally, image processing devices are known which divide input image data into image areas such as document areas, figure areas, picture (photograph) areas, and table areas, and process the image data by image area using a type of processing corresponding to the type of area. For example, when an original image is a mixture of a document and a photograph, the document area of input image data is converted into character codes through OCR processing, and the picture area is subjected to compression.

In this area-based image dividing, dotted lines and broken lines are extracted by:

(1) finding a figure that seems like a part of a broken line, and searching for a possible next part on the line extended from the figure;
(2) utilizing the angle and distance between short lines;
(3) grouping isolated pixels and extracting a dotted line/ broken line based on the straight line connecting the first and last pixels, the distance and height between the pixels.

However, these methods require a long calculation time, and merely provide extraction with low precision regarding dotted lines. Above all, it is impossible to detect special-shaped broken lines such as lines 1001 and 1002 in FIG. 11. In use of these methods in the area-based image dividing, a conceivable problem is that character recognition processing may be performed on image areas due to incorrect dotted/ broken line extraction.

The area-based image dividing is necessary for image processing devices such as an OCR device, a copying machine and a facsimile device, to process document areas, figure areas, table areas and the like with high precision.

Image dividing is performed by, e.g., a spectrum analysis method that divides input image data into various areas by analyzing Fourier spectrum of the image data, or a projection method disclosed in Japanese Patent Application Laid-Open No. 64-15889, that alternates detection of vertical projections and detection of horizontal projections of an image, and divides the image into areas based on peripheral-pixel distribution information.

The divided image areas are labeled by, e.g., a method that tracks the outline formed by the connected pixels.

However, the conventional area-based image dividing methods require a long calculation time, and increase storage area due to pixel-based processing. Further, with respect to an image having a complicated area structure, area dividing is realized with low precision.

Further, in the above methods, if the resolution of input image data is low, dividing precision is degraded, while if the resolution is high, labeling processing time is prolonged and storage area is increased.

SUMMARY OF THE INVENTION

The present invention has been made in consideration of the above situation, and has as its object to provide an image processing apparatus and method which enables extraction of dotted lines and/or broken lines by detecting dotted/ broken (dotted and/or broken) line separators as blocks.

It is another object of the present invention to provide an image processing apparatus and method which increases processing speed and saves memory consumption by reducing image data to be processed, prior to area-based image dividing.

It is another object of the present invention to provide an image processing apparatus and method capable of, if image data to be processed is multi-value image data, converting the multi-value image data into binary image data prior to area-based image dividing It is another object of the present invention to provide an image processing apparatus and method which easily performs noise elimination by regarding an image area that satisfies a specific condition as noise.

According to the present invention, the above object is attained by providing an image processing apparatus for dividing image data into a plurality of rectangular block areas, characterized by comprising: formation means for forming the block areas each containing a single or plural connected black pixels; extraction means for extracting block areas, having a block-area size smaller than a predetermined size, out of the block areas formed by the formation means, as separator-candidate block areas; combining means for, if a predetermined range around one of the separator-candidate block areas extracted by the extraction means includes another separator-candidate block area, combining the separator-candidate block areas as a new block area; and judgment means for judging whether or not the new block area obtained by the combining means is a separator block area between image areas, based on the shape of the new block area.

According to the above construction, image data is divided into a plurality of rectangular blocks, and a block, which contains a single or plural connected black-pixel data, and which has a block size smaller than a predetermined size, is extracted as a candidate for a dotted/broken-line separator block, that contains a part of a dotted/broken line as a separator between image areas. Regarding one candidate block, if another candidate block is found within a predetermined range, the candidate blocks are combined to be a new block. Then, each combination of blocks is examined to determine whether or not the shape of the continuity of black-pixels has a shape as a separator between image areas. Thus, separators comprising dotted/broken lines are detected.

Preferably, the extraction means can easily detect candidate blocks by simple processing. Then, regarding one candidate block, if an area expanded from the candidate block by a predetermined amount contacts or partially/ entirely includes another candidate block, the combining means combines the candidate blocks.

Preferably, the image processing apparatus further comprises judgment means for judging the type of each block formed by the forming means, based on its size, shape and black-pixel density.

Preferably, the image processing apparatus further comprises reduction means for reducing m×n pixel data of the image data into one pixel data by obtaining a logical sum of the m×n pixel data, before the forming means forms the blocks. This reduces the number of pixels to be processed, and reduces processing time and saves memory consumption.

Preferably, the image processing apparatus further comprises discrimination means for discriminating whether or not the image data to be processed is multi-value image data, and conversion means for, if the discrimination means determines that the image data is multi-value image data, converting the image data into binary image data. This enables area-based dividing of multi-value image data.

Preferably, the image processing apparatus further comprises elimination means for eliminating a combination of blocks, judged by the judgment means as a non-separator block, as noise. This enables noise elimination as well as area-based image dividing.

It should be noted that the term "black pixel" means a significant pixel. On the other hand, if an original image has a white object image with a black background image, the significant pixels in this case are white pixels.

Further, it is another object of the present invention to provide an image processing apparatus and method which enables high-speed and memory saving image-area judgment.

According to the present invention, the above object is attained by providing an image processing apparatus for discriminating the type of each of the image areas of image data, comprising: extraction means for extracting low-resolution one-pixel data from an m×n pixel area of the image data; area detection means for detecting a block area by a continuity of low-resolution pixel data; and discrimination means for discriminating the type of the block area detected by the area detection means, based on feature information of the block area.

Preferably, the values of m and n become greater as the resolution of input image data becomes higher. This enables substantially constant weighting against low-resolution pixels regardless of the resolution of the image data, thus enables image judgment under almost the same conditions.

Preferably, if the m×n pixel data includes at least one significant pixel data, the extraction means extracts low-resolution pixel data as a significant pixel with respect to the m×n pixel data. In this manner, if at least one black pixel data exists in m×n pixel data, low-resolution pixel data is extracted as a black pixel, and the extracted black pixel data can be used for judgment of block type.

Preferably, the extraction means includes calculation means for calculating a logical sum of the dot data of the respective m×n pixels. This obtains low-resolution pixel data by simple construction.

Preferably, the area detection means detects an area containing a continuity of low-resolution pixel data as a block. This simple construction enables high-speed processing on document data, picture data and table data which are generally mapped in units of blocks.

Preferably, the area detection means further comprises: significant-pixel obtaining means for obtaining a pixel position of a low-resolution significant pixel by line, comprising pixels each of the m×n pixel data; storage means for storing a start-position of a continuity of low-resolution significant pixel data and the number of pixels, by main-scanning line, and if a line of interest has no low-resolution significant pixel data, storing a predetermined judgment information; retrieval means for retrieving a two-dimensional block including the continuity of low-resolution significant pixel data, in accordance with contents stored in the storage means; and coordinate obtaining means for providing a label unique to each pixel of the block, and obtaining coordinates of the block based on coordinate positions of the pixels of the block. In this manner, only data of significant pixel position is stored in the storage means, otherwise, if no significant pixel exists in a line of interest, judgment information is stored. This reduces memory consumption.

Preferably, the discrimination means discrimination the type of the block of interest, discriminated by the area discrimination means, in accordance with the length, the width and the ratio of significant low-resolution pixels within the block. This enables correct judgment on the block.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 5 is a table showing the relation between block labels and block attributes, in the first embodiment;

DETAILED DESCRIPTION OF THE PREFERRED EMBODIMENT(S)

Preferred embodiments of the present invention will be described in detail in accordance with the accompanying drawings.

First Embodiment

Figure 1:
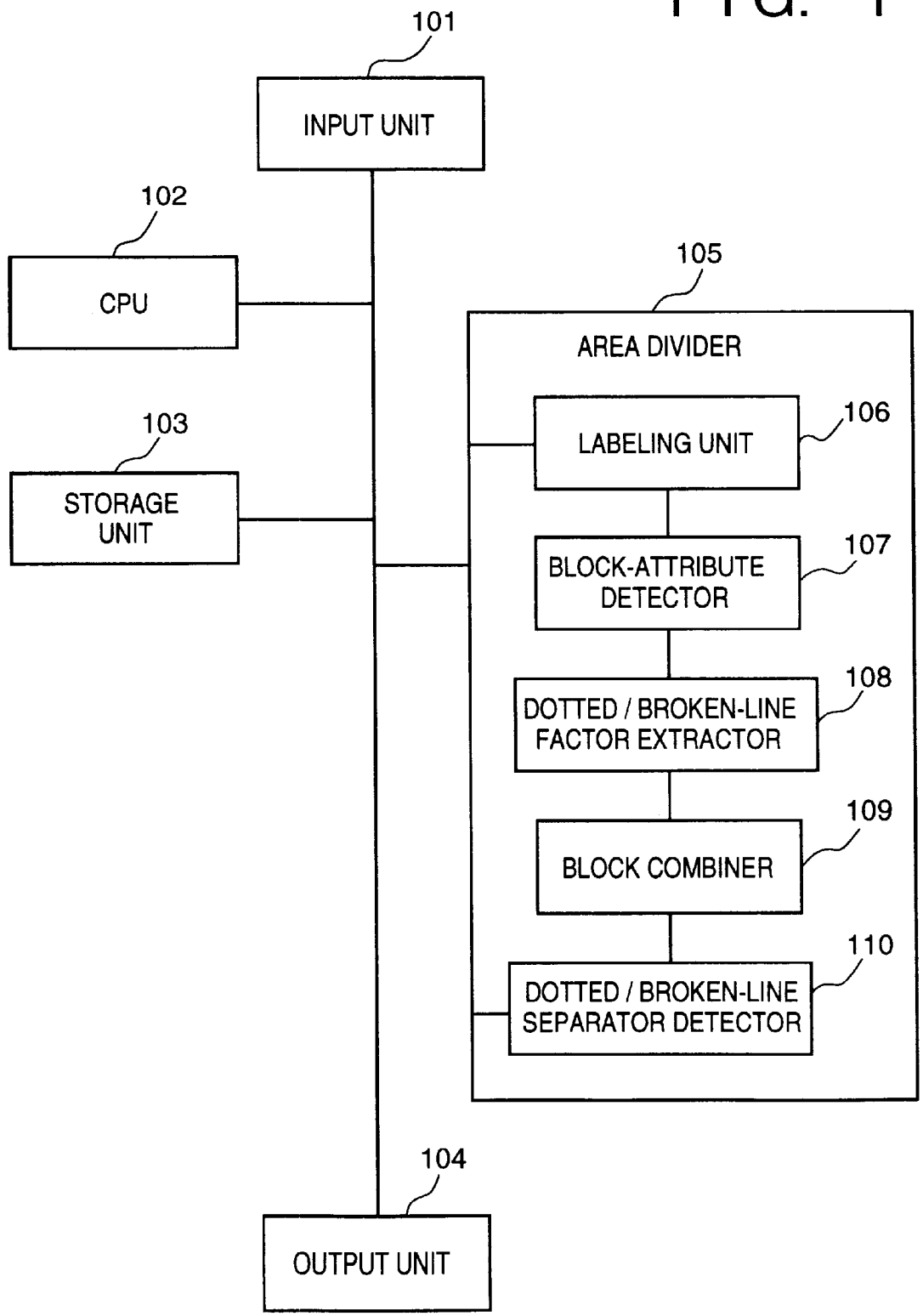
FIG. 1 is a block diagram showing the construction of an image processing apparatus according to a first embodiment of the present invention.

FIG. 1 shows the construction of an image processing apparatus according to a first embodiment of the present invention. In FIG. 1, reference numeral 101 denotes an input unit for inputting image data to be subjected to area-based image dividing; 102, a CPU for controlling the overall apparatus and performing calculation in respective processings; 103, a storage unit, comprising a ROM, a RAM and a hard disk etc., for storing control programs executed by the CPU 102 and various data; and 104, an output unit for outputting calculation results, image processing results and image data.

Numeral 105 denotes an area divider for performing area-based dividing on image data inputted from the input unit 101. The area divider 105 may be realized as the execution of area-based dividing by the CPU, or as a hardware construction comprising a dedicated processor.

Numeral 106 denotes a labeling unit for generating a plurality of blocks (rectangular image areas obtained by dividing input image data) and supplying labels to the respective blocks; 107, an block-attribute detector for detecting attributes of the respective blocks, such as "separator", "table", "figure" and "document"; 108, a dotted/broken-line factor extractor for extracting blocks, possibly containing dotted/broken-line factors, as candidates for dotted/broken-line separator blocks, from document blocks classified by the block-attribute discriminator 107; 109, a block combiner for combining the extracted candidate blocks, located within a predetermined range; and 110, a dotted/broken-line separator detector for detecting whether or not the combination of the candidate blocks, obtained by the block combiner 109, contains a dotted/broken-line separator.

The operation of the construction in FIG. 1 will be described. The area divider 105 divides image data inputted from the unit 101 into a plurality of image areas. First, the labeling unit 106 generates blocks of a plurality of pixels. Each block contains a single black pixel or connected black pixels. The block-attribute discriminator 107 detects types of the generated blocks, such as "figure", "table" and "document". The dotted/broken-line factor extractor 108 extracts a block having a size smaller than a predetermined size, as a candidate for a dotted/broken-line separator block, from the generated blocks. The block combiner 109 combines one dotted/broken-line separator candidate block with another dotted/broken-line separator candidate block, to generate a combination of blocks. The dotted/broken-line separator detector 110 determines whether or not the combination of candidate blocks has a continuity of black pixels of a shape to be a separator between image areas, then detects a dotted/broken-line separator based on the determination.

Figure 2:
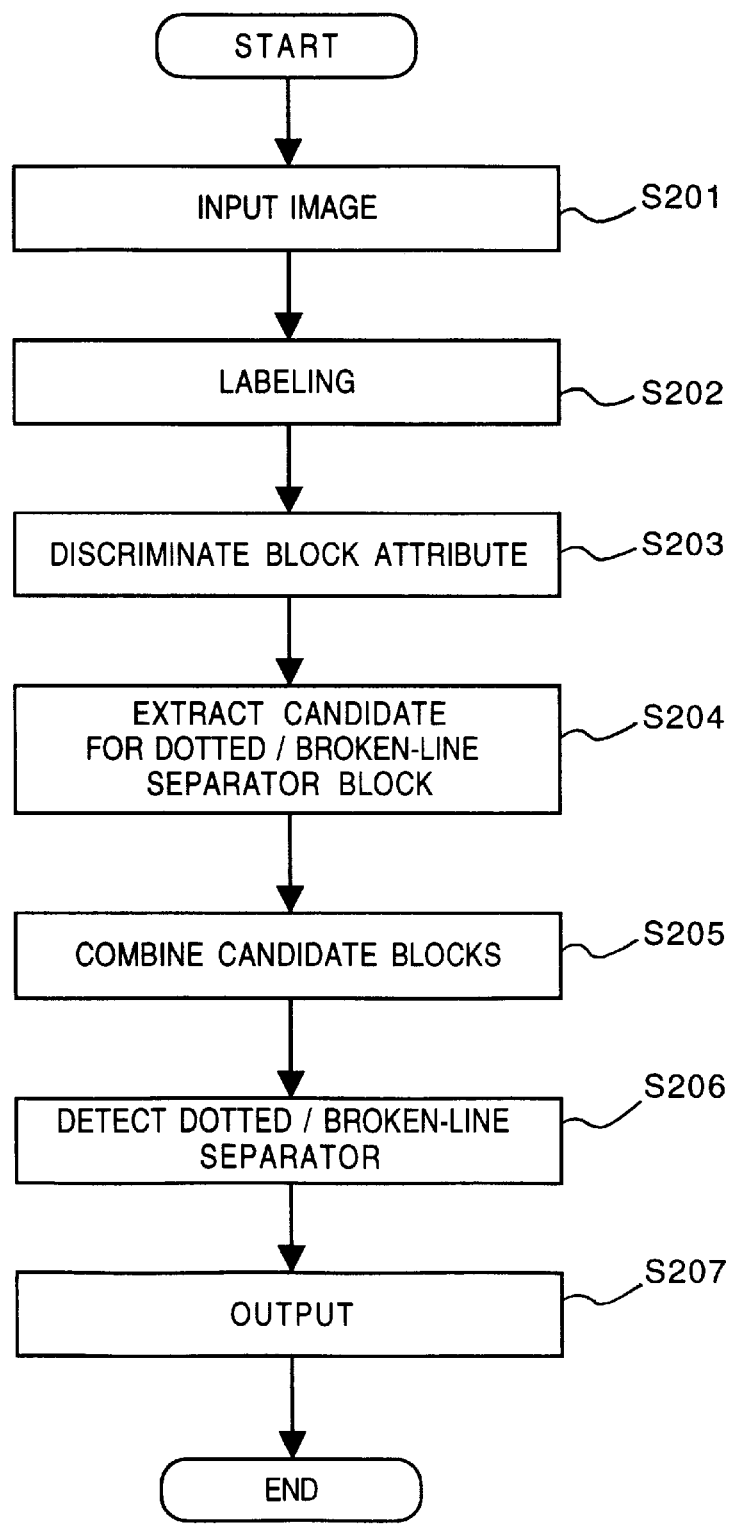
FIG. 2 is a flowchart showing image processing procedure of the image processing apparatus according to the first embodiment.

FIG. 2 shows the image processing of the image processing apparatus according to the first embodiment. The control program for this processing is stored in the storage unit 103. The area-based image dividing by the image processing apparatus of the present embodiment will be described with reference to FIG. 2.

In step S201, an original image is inputted from the input unit 101. In step S202, the labeling unit 106 performs block-based area extraction and labeling of the respective extracted blocks.

In the labeling unit 106, the input image data is scanned by line, and for each line scanning, a label number is given to each black pixel of the line. The labeling is made such that a black pixel, connected to another black pixel in upward/downward, rightward/leftward, diagonally right-upward/downward, or diagonally left-upward/downward direction, has the same label. The block-based area extraction is made such that a continuity of black pixels is enclosed with a block.

Figure 3:
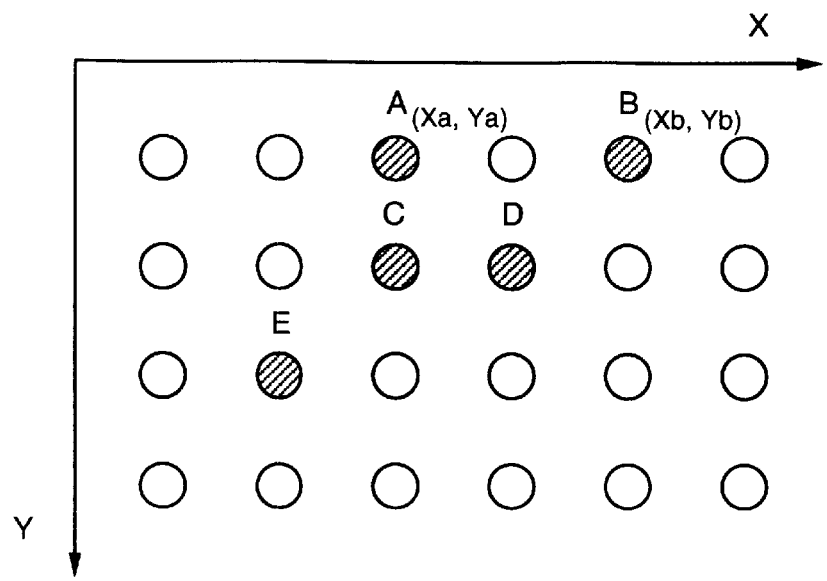
FIG. 3 is an explanatory view showing a part of image data used in the first embodiment.
Figure 4:
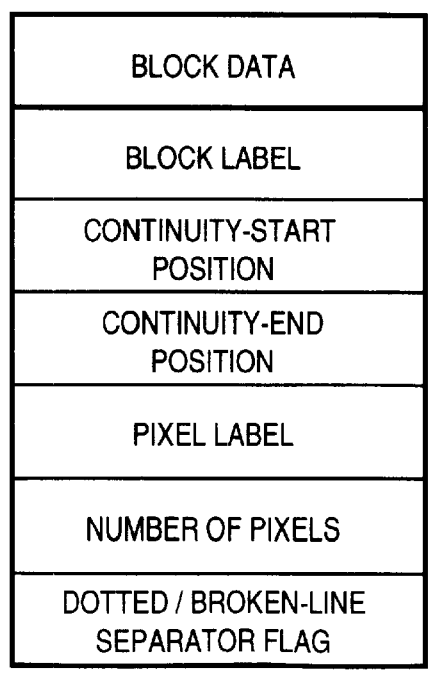
FIG. 4 is an explanatory view showing data structure of block in the first embodiment.

The labeling will be described in detail with reference to FIGS. 3 and 4. FIG. 3 illustrates a part of image data. FIG. 4 shows the data structure of block data. In the example of FIG. 3, a first detected black pixel A is given a pixel label "1". Then, as block data, coordinates "(Xa, Ya)" of the pixel A as a start position and end position of black-pixel continuity, the number of pixels "1" and block label "1", the same as pixel label "1" are stored into the storage unit 103. Note that a dotted/broken-line factor flag in FIG. 4 will be explained later.

Next, in FIG. 3, the next black pixel B that is not connected with the pixel A (these pixels are in the first line) is given a pixel label "2". Then, as block data of the pixel B, coordinates "(Xb, Yb)" as continuity-start and continuity-end positions of continuity, the number of pixels "1", and a block label "2" are stored into the storage unit 103 as new block data. When this labeling processing on the first line has been completed, the process is directed to the second line.

In the second line, as the first black pixel C is connected with the pixel A in the previous line in the upward direction, the same pixel label "1" as that of the pixel A is given to the pixel C. In the block data labeled "1", the number of pixels "1" is changed into "2" (1+1), the block label "1" is not changed, and the coordinates of the continuity-end position are changed from "(Xa, Ya)" to "(Xa, Yc)" (the continuity-start position is not changed).

The next black pixel D is connected to the pixel C in the leftward direction, then is given the same pixel label "1". In the block data "1", the number of pixels is changed from "2" to "3", the block label "1" is not changed, and the coordinates of the continuity-end position "(Xa, Yc)" are changed into "(Xd, Yc)" (the Y-coordinate value of the continuity-end position is not changed).

In this manner, the pixel coordinates indicating the continuity-start/end position are changed in the progress of line scanning, thus an image block including the pixels A, C and D (block label=1) is obtained.

At this time, since the pixel D is also connected with the pixel B, the pixel label of the pixel B is changed from "2" to "1". In the block data "1", the number of pixels "3" is changed into "4", the block label "1" is not changed, and the coordinates of the continuity-end position "(Xd, Yc") are changed into "(Xb, Yc")". The block data labeled "2" is invalidated by changing the block label "2" into "0".

In this manner, this labeling processing on the second line has been completed, the process is directed to the third line.

In the third line, the first black pixel E is connected with the pixel C in the orthogonally right-upward direction, then is given the pixel label "1". In the block data "1", the number of pixels is changed from "4" to "5" (4+1), the block label "1" is not changed, and the coordinates of the continuity-start position are changed from "(Xa, Ya)" to "(Xe, Ya)", and the coordinates of the continuity-end position are changed from "(Xb, Yd)" to "(Xb, Ye)". In this manner, block-based area extraction and labeling is performed on all the input pixels by line.

When the block-based area extraction and labeling have been completed, the process proceeds to step S203, in which the block-attribute discriminator 107 classifies the blocks into "document" blocks, "figure/picture" blocks, "table" blocks and "separator" blocks, and changes the block labels as shown in FIG. 5. Note that FIG. 5 shows the relation between the block labels and block attributes.

Figure 6:
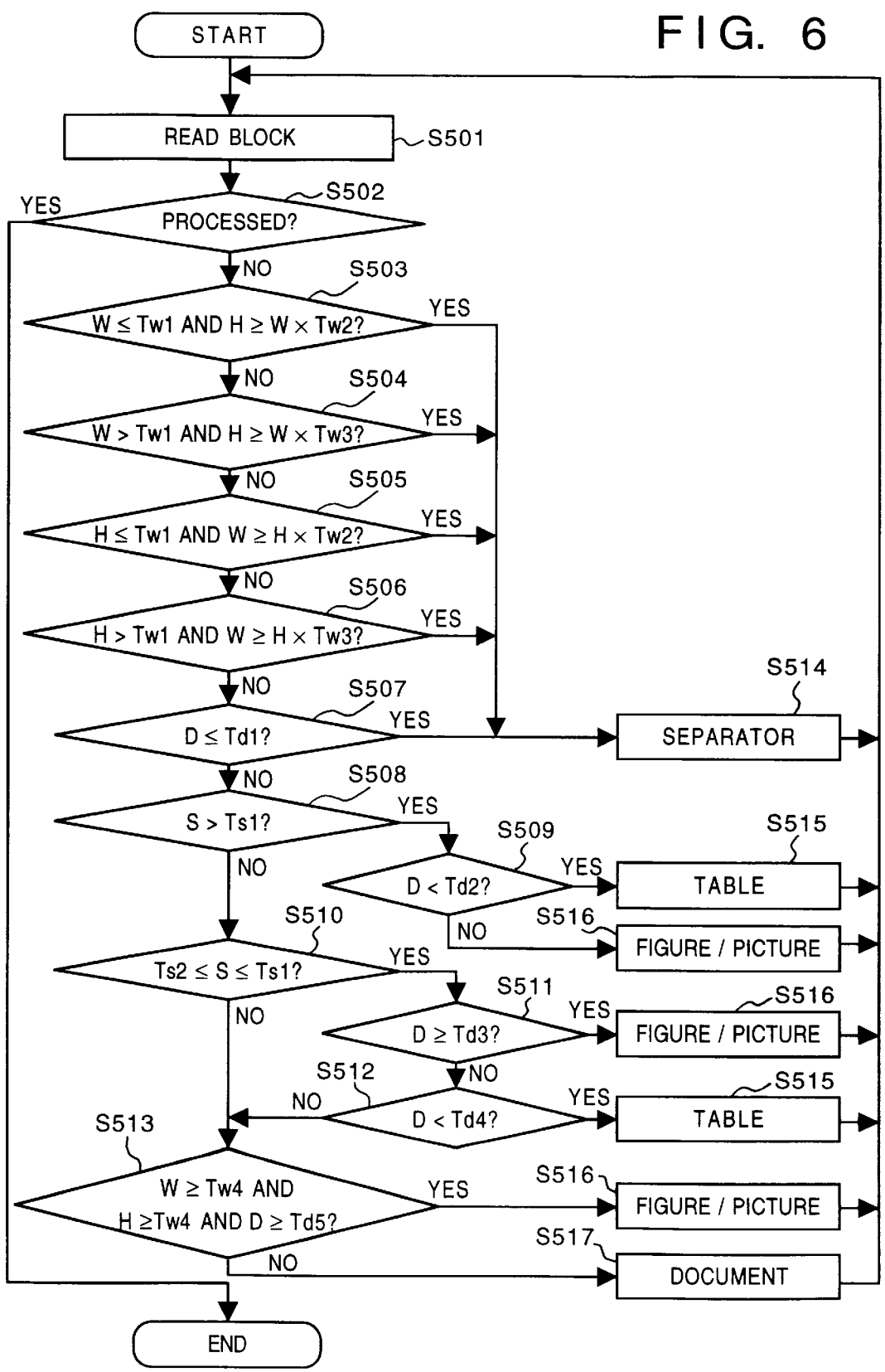
FIG. 6 is a flowchart showing the procedure of block-attribute discrimination processing according to the first embodiment.

FIG. 6 shows block-attribute discrimination according to the present embodiment. In this example, the block-attributes are discriminated using a block width W, a block height H, a block area S corresponding to the number of all of pixels within the block, and a pixel density D, i.e., the number of black pixels per block area S. These values are easily obtained by calculation using block data.

In step S501, one of the blocks from the labeling unit 106 is read. Then, whether or not this block has been already processed is determined (repeated process indicates whether the blocks have been processed) in step S502. If YES, the process ends. If NO, i.e., the block has not been processed yet, i.e., there is an unprocessed block, the process proceeds to step S503, in which a block attribute is discriminated.

If the width W equals to a width threshold value Tw1 or less and the height H equals to the width W×a width threshold value Tw2 or greater (W≦Tw1 and H≧W×Tw2) in step S503, otherwise if the width W is greater than the threshold value Tw1 and the height H equals to the width W×a width threshold value Tw3 or less (W>Tw1 and H≧W×Tw3) in step S504, it is determined that the block contains a vertical separator, and the block label is changed to "−3" in step S514. Note that the pixel labels in the block are maintained. Similarly, if the height H equals to a height threshold value Tw1 or less and the width W equals to the height H×the width threshold value Tw2 or greater (H≦Tw1 and W≧H×Tw2) in step S505, otherwise if the height H is greater than the threshold value Tw1 and the height H is the height H×the width threshold value Tw3 or greater (H>Tw1 and W≧H×Tw3) in step S506, it is determined that the block contains a horizontal separator, and the block label is changed into "−3" in step S514.

In a case where none of the above conditions is satisfied, if the pixel density D equals to a density threshold value Td1 or less (D≦Td1) in step S507, it is determined that the block contains a special-shaped separator, e.g., a hook-shaped separator, and the block label is changed into "−3" in step S514.

In a case where the area S is greater than an area threshold value Ts1 (S>Ts1) in step S508, if the pixel density D is less than an density threshold value Td2 (D<Td2) in step S509, it is determined the block is a table block, and the block label is changed into "−4" in step S515. If the pixel density D is greater than the threshold value Td2, it is determined that the block is a figure/picture block, and the block label of changed into "−5" in step S516.

In a case where the area S equals to the area threshold value Ts1 or less and equals to the threshold value Ts2 or greater (Ts2≦S≦Ts1) in step S510, if the pixel density D equals to a density threshold value Td3 or greater (D≧Td3) in step S511, otherwise if the width W and the height H both equal to a width threshold value Tw4 or greater and the pixel density D equals to a density threshold value Td5 or greater (W≧Tw4 and H≧Tw4 and D≧Td5) in step S513, it is determined that the block is a figure/picture block, and the block label is changed into "−5" in step S516.

Further, if YES (Ts2≦S≦Ts1) in step S510, if the pixel density D is less than a density threshold value Td4 (D<Td4) in step S512, it is determined that the block is a table block and the block label is changed into "−4" in step S515.

In this manner, the block attribute such as "separator", "figure/picture" and "table" is determined. The blocks having attributes other than the above attributes are regarded as document blocks, and the block labels are maintained, i.e., the same as the pixel labels (step S517).

Figure 7:
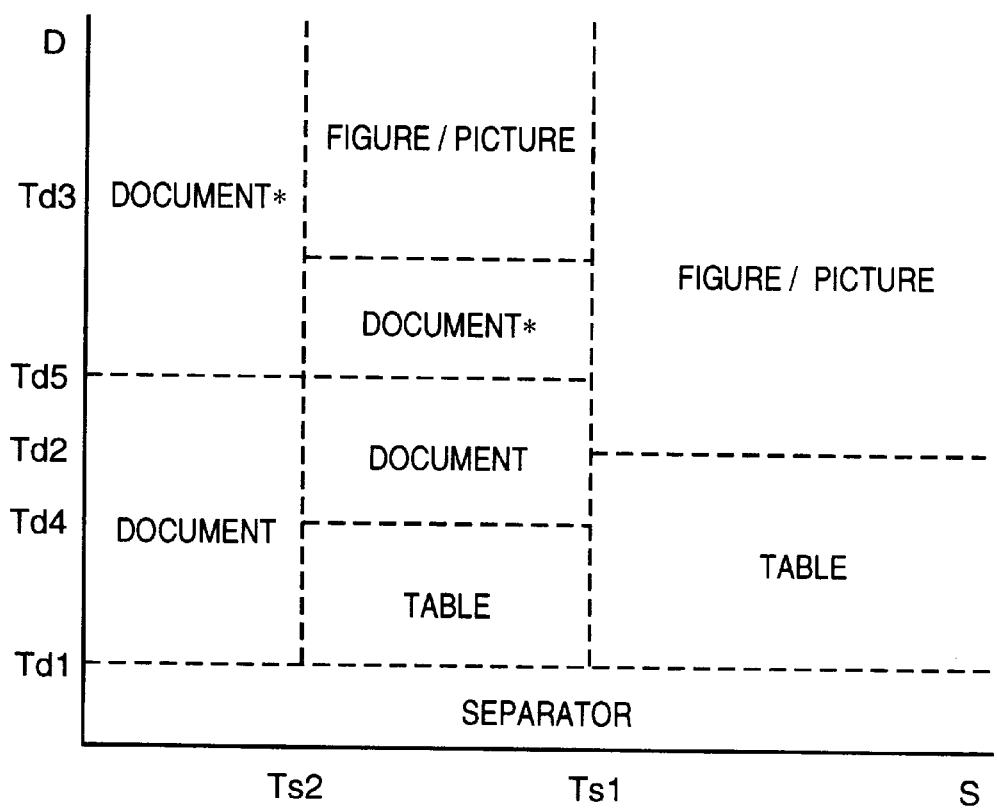
FIG. 7 is an explanatory view showing discrimination standards based on an area S and a pixel density D, used by a block-attribute detector of the first embodiment.

Thus, the block-attribute discriminator 107 discriminates the attributes of the blocks generated by the labeling unit 106. FIG. 7 shows discrimination standards based on the area S and the pixel density D, used by the block-attribute discriminator 107. According to the flowchart of FIG. 6, the block attributes are discriminated based on the areas S and the pixel densities D, as shown in FIG. 7. Note that the determination of the "separator" attribute in steps S503 to S506 is made based on the width/height ratio of the block, and discrimination standards based on the width W and the height H are not shown in FIG. 7.

Returning to FIG. 2, in step S204, the dotted/broken-line factor extractor 108 extracts candidates for dotted/broken-line separator blocks from the blocks, which were determined as being "document" blocks based on the block-attribute discrimination in step S203.

Figure 8:
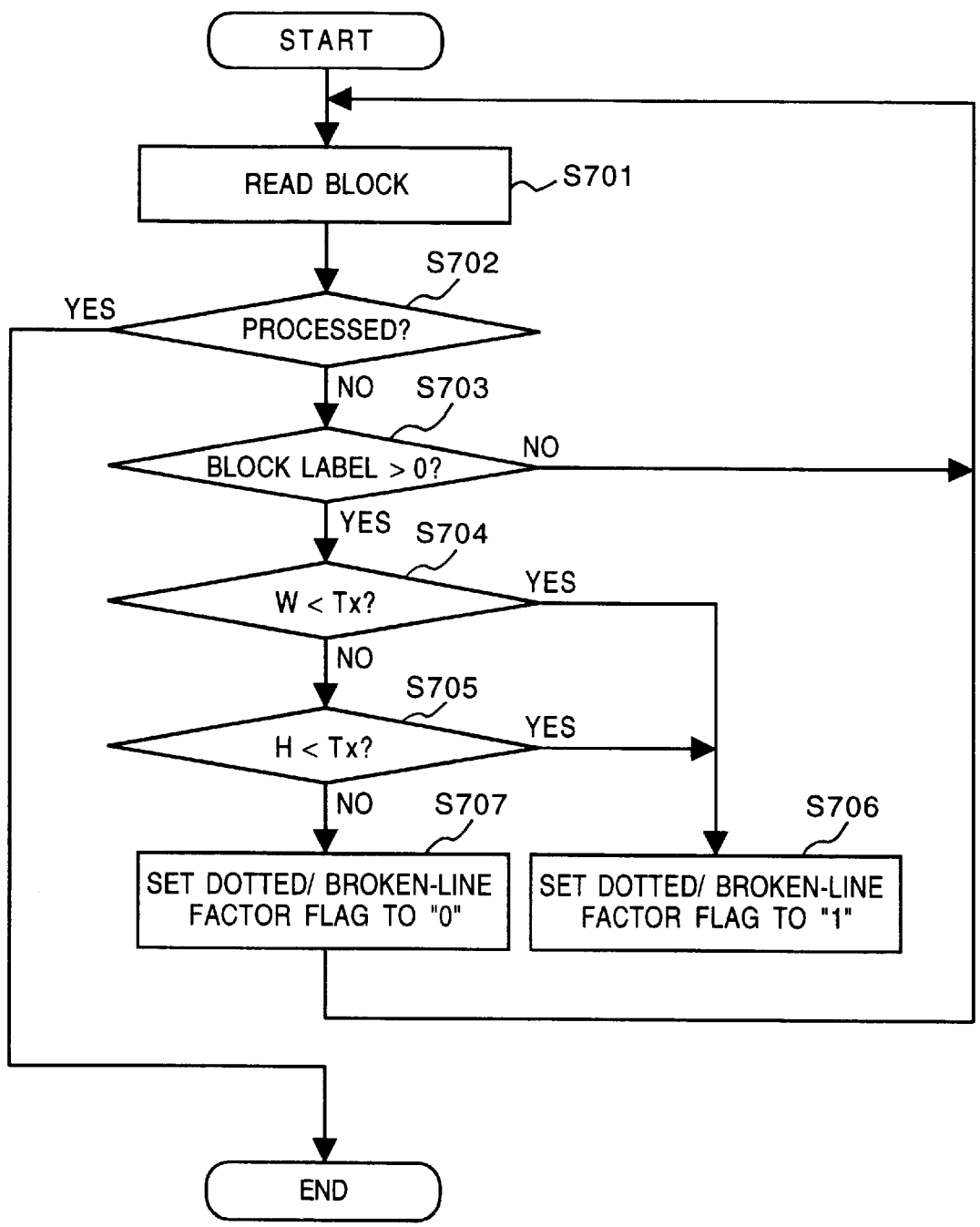
FIG. 8 is a flowchart showing the procedure of extracting candidates for dotted/broken-line separator blocks according to the first embodiment.

FIG. 8 shows the procedure of extracting candidates for dotted/broken-line separator blocks according to the present embodiment. In step S701, one of the blocks is read and examined to determine whether or not it has already been processed. In step S702, if it is determined that the block has been processed, the process ends. On the other hand, if the block has not been processed yet, the process proceeds to step S703, in which whether or not the block label of the block of interest is greater than "0" is determined. If YES, it is determined that the block is a document block, and the process proceeds to step S704, in which whether or not the block contains a dotted/broken-line factor is determined. If No in step S703, i.e., the block label is "0" or less, it is determined that the block is not a document block, the process returns to step S701 to examine the next block.

In steps S704 and S705, if at least one of the width W and the height H of the block is less than a threshold value Tx, (W<Tx or H<Tx), it is determined that the block is a candidate for a dotted/broken-line separator block, then the process proceeds to step S706, in which a dotted/broken line factor flag (FIG. 4) in the block data is set to "1". On the other hand, if both the width W and the height H are equal to or greater than the threshold value Tx, it is determined that the block is a "document" block, then the process proceeds to step S707, in which the dotted/broken-line factor flag (FIG. 4) in the block data is set to "0".

Next, referring to FIG. 2, in step S205, the block combiner 109 combines separator candidate blocks (blocks having block data where dotted/broken-line factor flag is "1") within a predetermined range.

Figure 9:
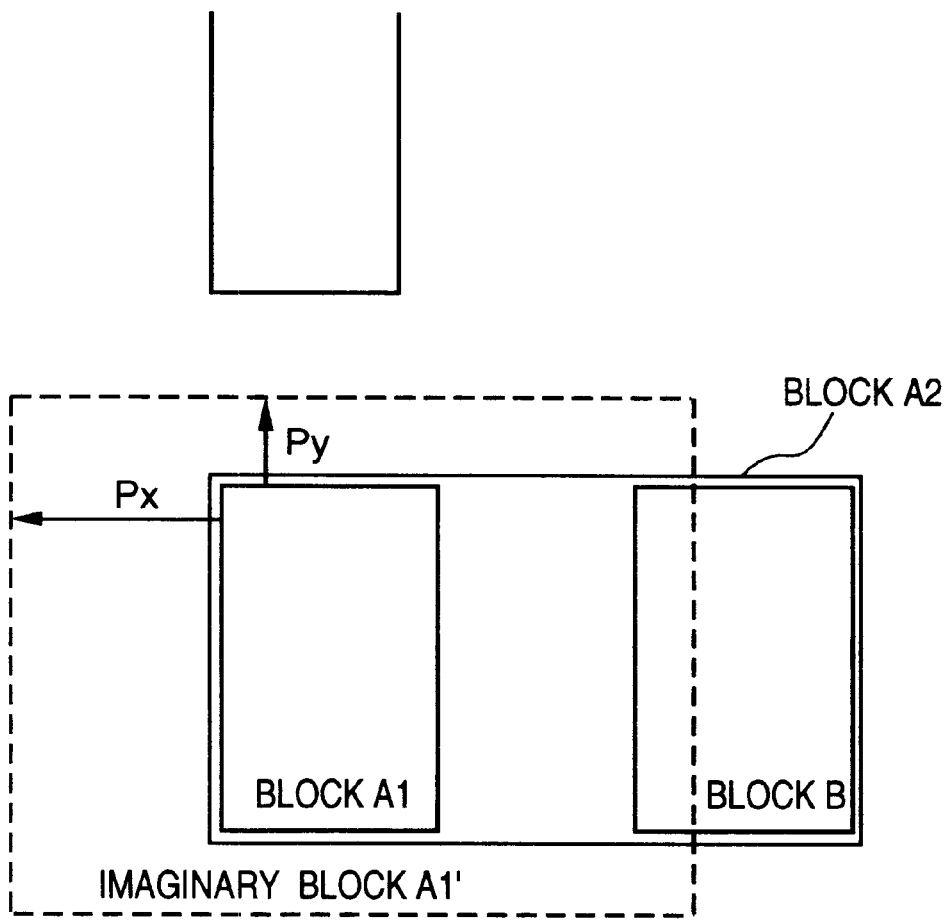
FIG. 9 is an explanatory view showing combining of blocks, judged as candidates for dotted/broken-line separator blocks.

FIG. 9 shows the combining of candidates for dotted/broken-line separator blocks. In FIG. 9, separator candidate blocks A1 and B are combined. First, an imaginary block A1' expanded in a direction X by amount Px and in a direction Y by amount Py is generated. Then, whether or not the block A1' contacts or partially/entirely includes any separator candidate block is examined. As the block A1' partially includes the block B, the blocks A1 and the B are combined. Thus, a new block A2 is generated.

The block data of the block A1 is updated and stored as block data of the new block A2. The block data of the block B is invalidated by changing the block label into "0". Note that the extension amounts Px and Py are predetermined values. If an imaginary extended block contacts a "figure/ table" block, or "non-dotted/broken-line separator" block, the combining is not performed.

In this manner, the block combining is repeated until there is no block to be combined, then the process ends.

Figure 10:
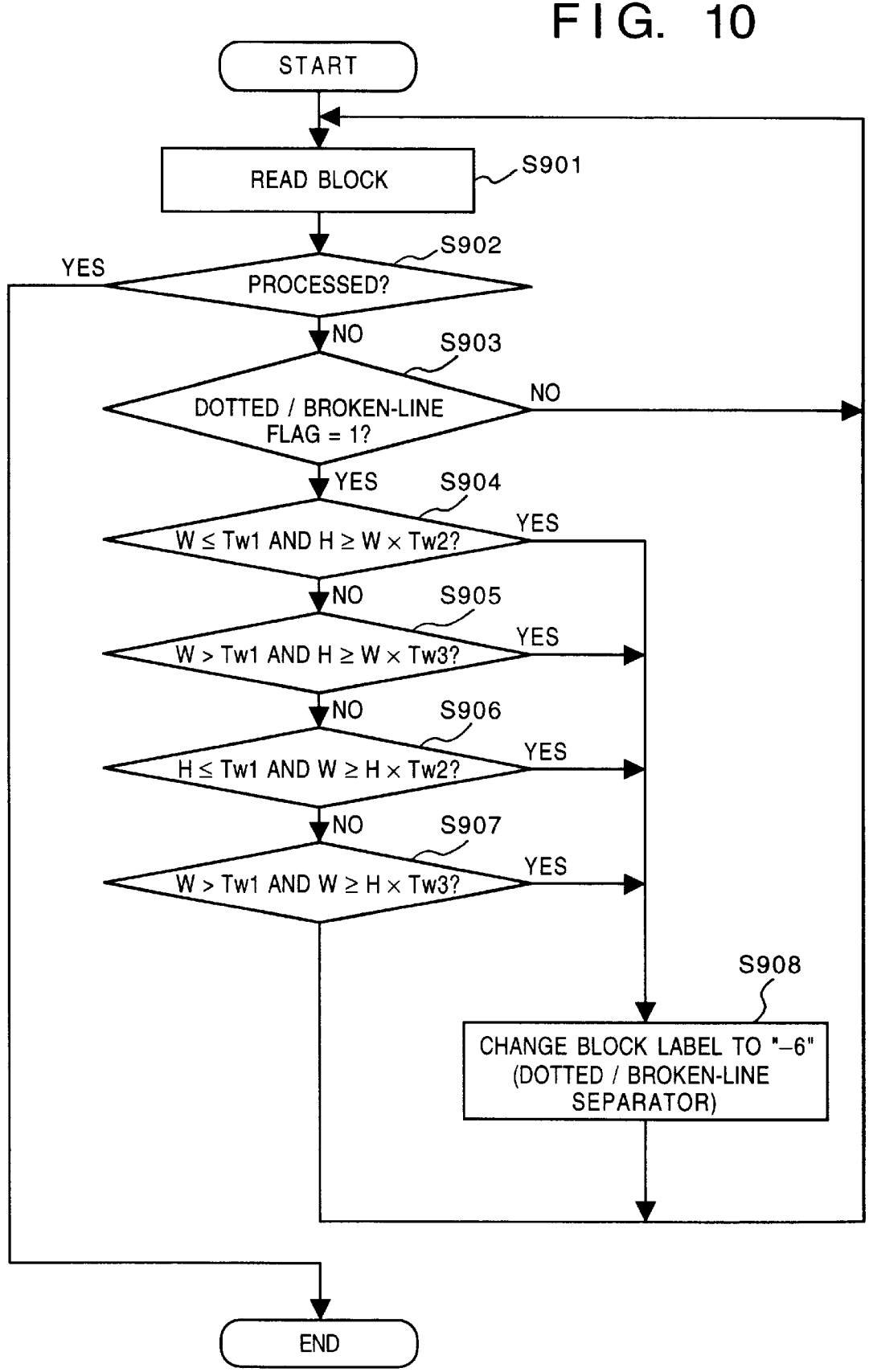
FIG. 10 is a flowchart showing the procedure of judging whether or not a combination of candidate blocks contains a dotted/broken-line separator.

In step S206 (FIG. 2), the dotted/broken-line separator detector 110 determines whether each combination of blocks is a dotted/broken-line separator block. FIG. 10 shows the procedure of judging whether or not a combination of blocks contains a dotted/broken-line separator.

In step S901, one block is read, and in step S902, whether or not it has already been processed is examined. If YES, the process ends, while if NO, it proceeds to step S903, in which whether or not the block of interest is a candidate for a dotted/broken-line separator block is determined. That is, whether or not the value of the dotted/broken-line factor flag of the block data is "1" is examined, and if it is not "1", the process returns to step S901 to process the next block. If the flag value is "1", the process proceeds to step S904.

In step S904 and the subsequent steps, whether the block of interest is a dotted/broken-line separator block is determined based on its length/width ratio. In this example, similar to the vertical-separator extraction, if the width W equals to the width threshold Tw1 or less and the height H equals to the width W×width threshold Tw2 or greater (W≦Tw1 and H≧W×Tw2, step S904), the block label is changed to "−6" in step S908, and, if the width W is greater than the width threshold Tw1 and the height H equals to the width W×the width threshold Tw3 or greater (W>Tw1 and H≧W×Tw3, step S905), it is determined that the block is a dotted/broken-line separator block. Then, in step S908, the block label is changed to "−6". Note that the pixel labels of the pixels constituting the block are maintained.

Further, if the height H equals to the width threshold Tw1 or less and the width W equals to the height H×width threshold Tw2 or greater (H≦Tw1 and W≧H×Tw2, step S906), and, if the height H is greater than the width threshold Tw1 and the width W equals to the height H×the width threshold Tw3 or greater (H>Tw1 and W≧H×Tw3, step S907), it is determined that the block is a dotted/broken-line separator block. Then, in step S908, the block label is changed to "−6".

Finally, in step S207 in FIG. 2, the block data of the dotted/broken-line separator block obtained in the above processing is outputted from the output unit 104 with various block data and image data.

It should be noted that image reduction may be performed on input image data prior to block-based image dividing. For example, assuming that the resolution of m×n pixel input image data is Rdpi (dpi=dot/inch) or higher, the size of the input image data may be reduced to 1/m×1/n, with a logical sum of the length m dots and the width n dots as a pixel value corresponding to the m×n pixels. If the resolution is lower than Rdpi, a logical sum of the length p(p<m) dots and the width q(q<n) dots is obtained, and the image size is reduced to 1/p×1/n. In this example, if the m×n image or the p×q image includes at least one black pixel, a reduced image becomes a black image. In this manner, the reduction ratio is changed in accordance with the resolution to contain the number of pixels per unit length, so that the aforementioned block-attribute threshold values can also be used.

Then, the block-based image dividing may be performed on the reduced image. This further reduces storage area and processing time. In this method, a plurality of pixels are ORed and thus the amount of calculation is reduced. However, other methods can be employed for image reduction.

For example, the input unit 101 may determine whether or not input image data is multi-value image data, and if it is multi-value image, the input image data may be converted into binary image data. This enables image dividing even if input image data is multi-value image data such as color image data.

Further, in the dotted/broken-line separator detector 110, the candidate blocks which have not been detected as dotted/broken-line separator blocks may be treated as noise. This easily eliminates noise from image data.

Figure 11:
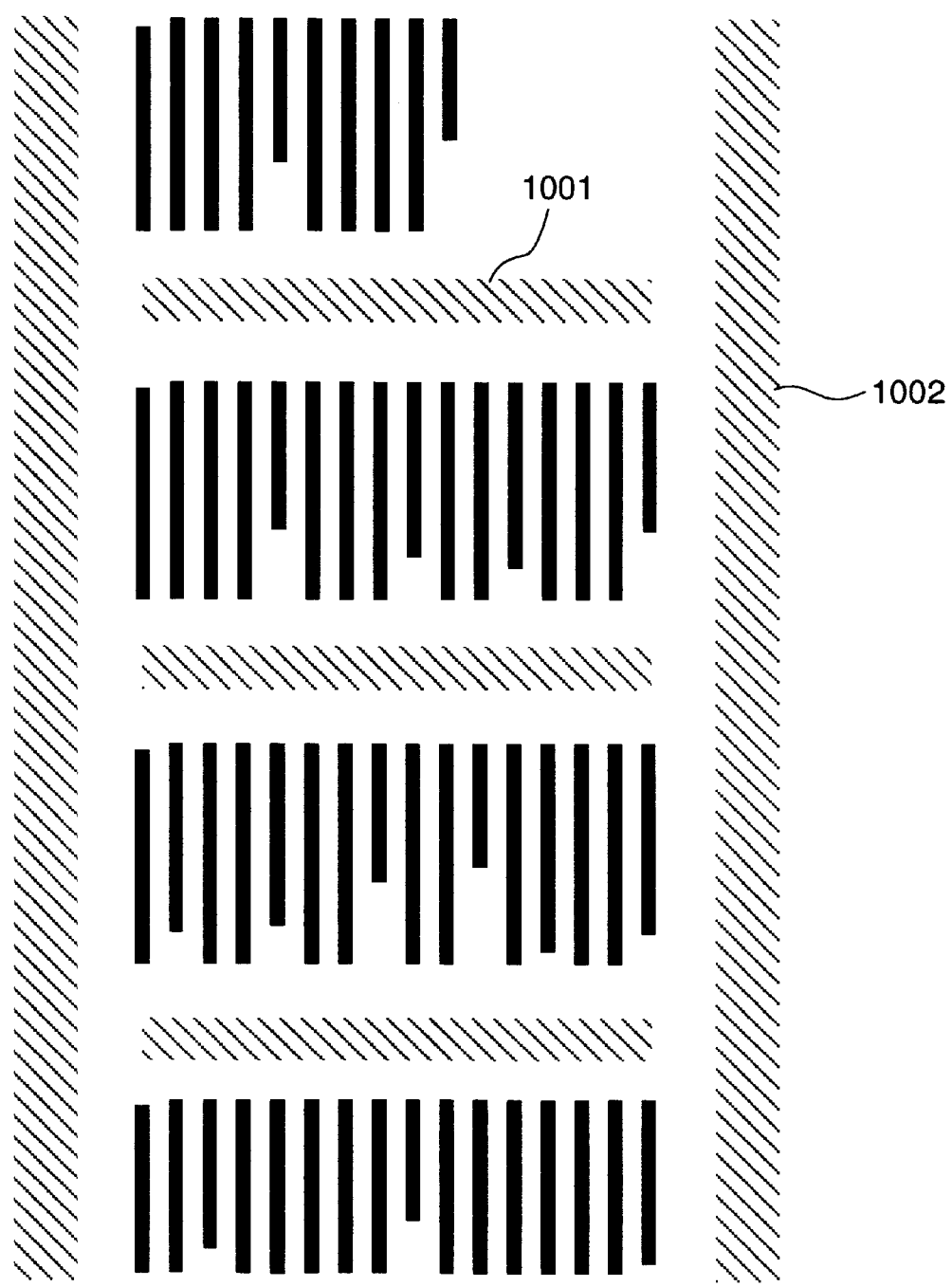
FIG. 11 is an example of a special-shaped broken-line separators.

As described above, the present embodiment divides input image data into a plurality of blocks, discriminates attributes of the respective blocks, thereafter, extracts small-sized blocks as candidates for dotted/broken-line separator blocks, combines the candidate blocks, and detects dotted/broken-line separators by judging the dotted/broken-line combination of candidate blocks. This construction may be realized by merely adding the program for dotted/broken-line separator detection, as a module, to a general area-based image dividing program. Accordingly, the present embodiment attains the following advantages without greatly changing existing programs: (1) reduction of processing time; (2) improvement in area-based dividing on a complicated area-structured image, especially an image including a dotted line or broken line; (3) detection of special broken lines (e.g., 1001 and 1002 in FIG. 11); and (4) easy noise elimination.

Also, the present embodiment attains (1) reduction of image-processing time and (2) reduction of storage area, without greatly changing the existing programs, by using image reduction where m×n pixel input image data is reduced to 1/m×1/n pixel image data by obtaining a logical sum of the length m dots and the width n dots of the input image data.

As described above, the present embodiment attains more reliable extraction of dotted/broken-line separators.

Second Embodiment

Figure 12:
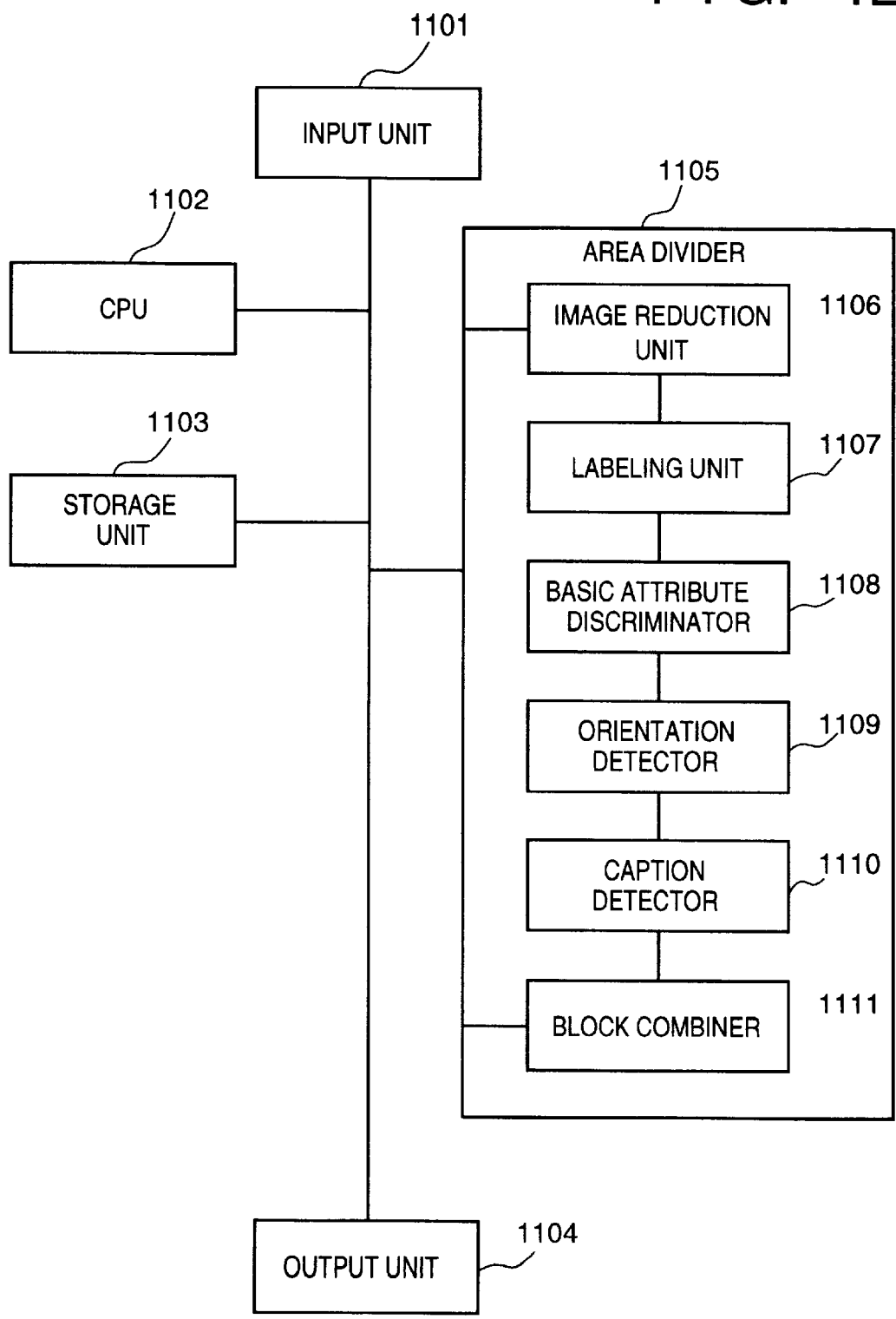
FIG. 12 is a block diagram showing the construction of an image processing apparatus according to a second embodiment of the present invention.

FIG. 12 shows the construction of an image processing apparatus according to a second embodiment of the present invention. In FIG. 12, numeral 1101 denotes an image scanner as an input unit for inputting image data. Note that the input unit 1101 is not limited to the image scanner, but it may be any other device, e.g., an interface for inputting image data from an external device such as a host computer, or for facsimile reception, as far as it is for inputting image data.

Numeral 1102 denotes an arithmetic operation unit (hereinafter referred to as "CPU") for performing arithmetic operations in various controls and processings; 1103, a storage unit for storing control programs for the CPU 102 and various data; and 1104, an output unit for outputting calculation results, image processing results and image data.

Numeral 1105 denotes an area divider comprising: an image reduction unit 1106, a labeling unit 1107 for labeling reduced pixel data and for generating initial block data; a basic attribute discriminator 1108 for detecting separator, table, figure etc.; an orientation detector 1109 for detecting the orientation of document; a caption detector 1110 for detecting captions; and a block combiner 1111.

Figure 13:
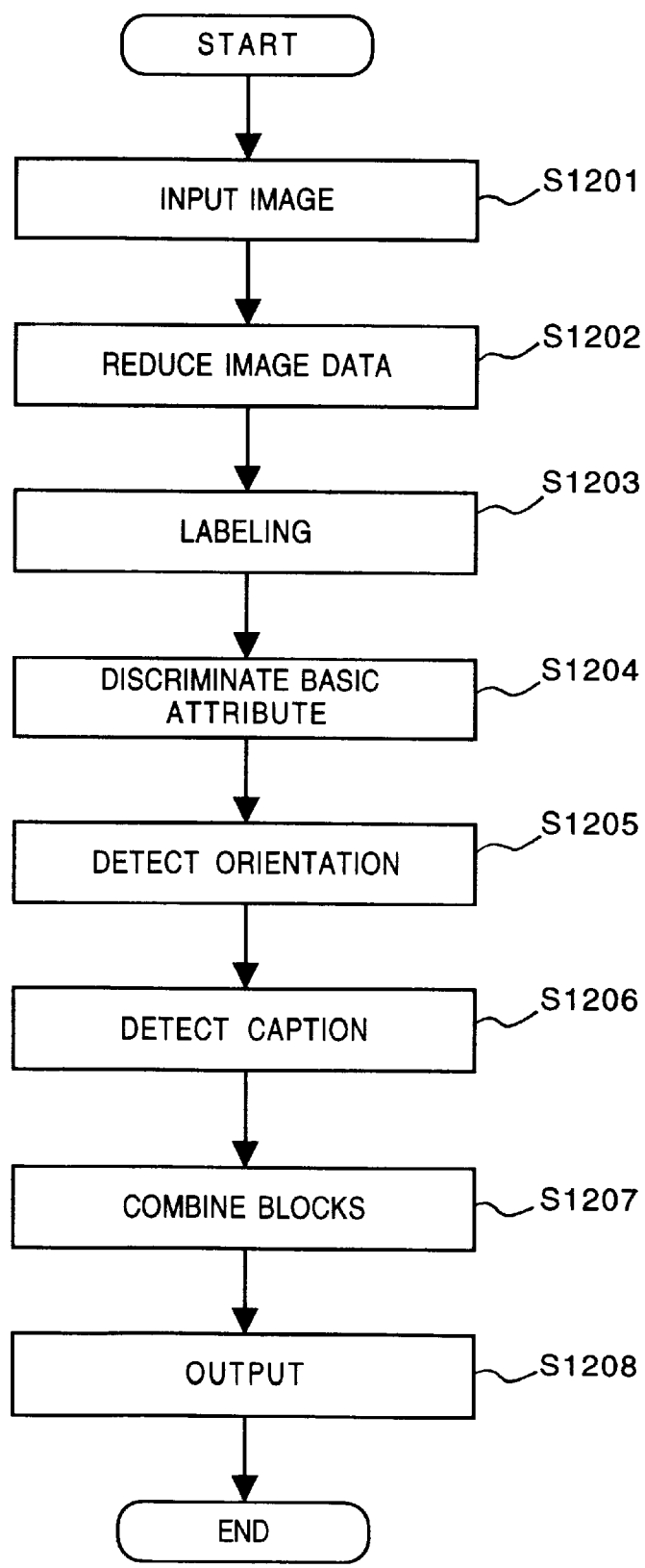
FIG. 13 is a flowchart showing image processing procedure of the image processing apparatus according to the second embodiment.

FIG. 13 shows image processing by the image processing apparatus according to the second embodiment. The control program for executing this processing is stored in the storage unit 103. The operation of the present embodiment will be described with reference to the flowchart of FIG. 13.

1) Step S1201

First, image data is inputted from the input unit 1101.

2) Step S1202

Next, if the resolution of the input image data is Rdpi or higher, the image reduction unit 1106 obtains a logical sum of m-dot length and n-dot width, as one pixel of reduced image. If the resolution of the input image data is lower than Rdpi, the image reduction unit 1106 obtains a logical sum of p-dot length and q-dot width, as one pixel of reduced image (m>p, n>q). In comparison with a higher resolution image, one pixel data of a lower resolution image is more significant. For this reason, the image reduction is made based on resolution. It is preferable that in a case where image data of various resolutions are inputted, the reduction methods corresponding to various resolutions are provided. Note that determination of resolution of input image data may be instructed from an external operation panel (not shown), otherwise, an image data originator (e.g., host computer) may add a resolution designation command to the header of image data, and command may be interpreted for determining the resolution.

In the above operation, if m×n or p×q pixel image contains at least one black pixel, the reduced image becomes "black" image ("black" in this example indicates a significant pixel).

Figure 16:
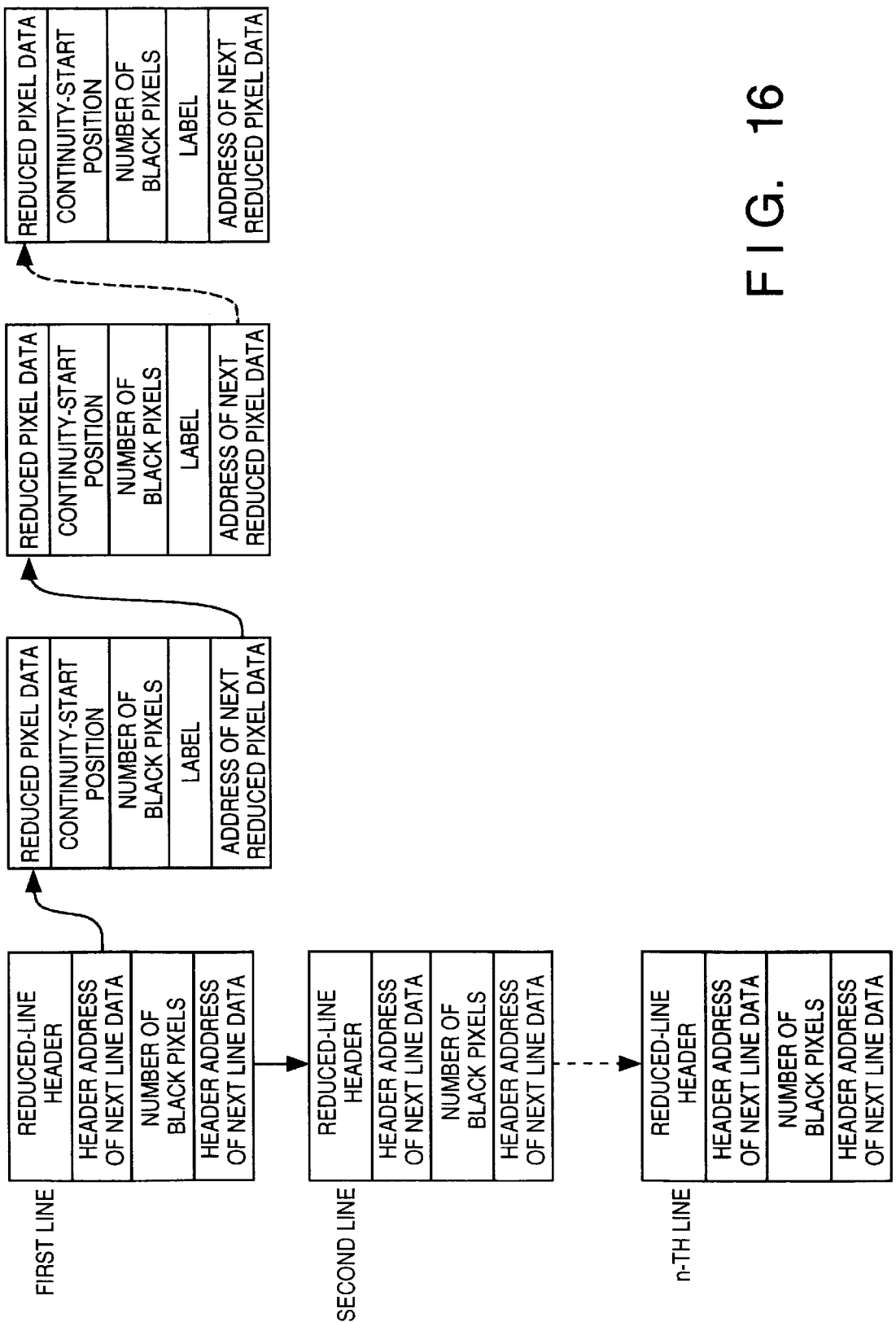
FIG. 16 is an explanatory view showing the link structure of reduced pixel data in one line and the link structure of headers in the respective lines.

In the reduced image, a continuity of black pixels in a main-scanning direction is regarded as a set of reduced pixel data, and an x-coordinates of the first black pixel and the number of black pixels are stored as reduced pixel data, as shown in FIG. 16.

In FIG. 16, the reduced pixel data in the main-scanning direction are linked sequentially from the left, and the address of the leftmost pixel data is stored in a reduced line header.

Further, the reduced-line headers are linked, so that all the reduced line data are accessed as a set of reduced image data.

More specifically, the header of each reduced line data holds an address (pointer) of memory area where the next reduced pixel data is stored and an address of memory area where a header address of the next line data.

3) Step S1203

Next, the processing by the labeling unit 1107 will be described. This processing is similar to the labeling in the first embodiment, however, the labeling in this embodiment is made with respect to reduced pixels.

The labeling unit 1107 refers to reduced pixel data by each black pixel, and adds a label to each black pixel, such that pixel data connected orthogonally upward/downward directions have the same pixel label, thus forming a block data containing the continuity of black pixels. Note that the continuities of black pixels in a subscanning direction have been represented as reduced pixel data, for this reason, only continuities in the upward/downward and orthogonally upward/downward directions are examined.

Figure 14:
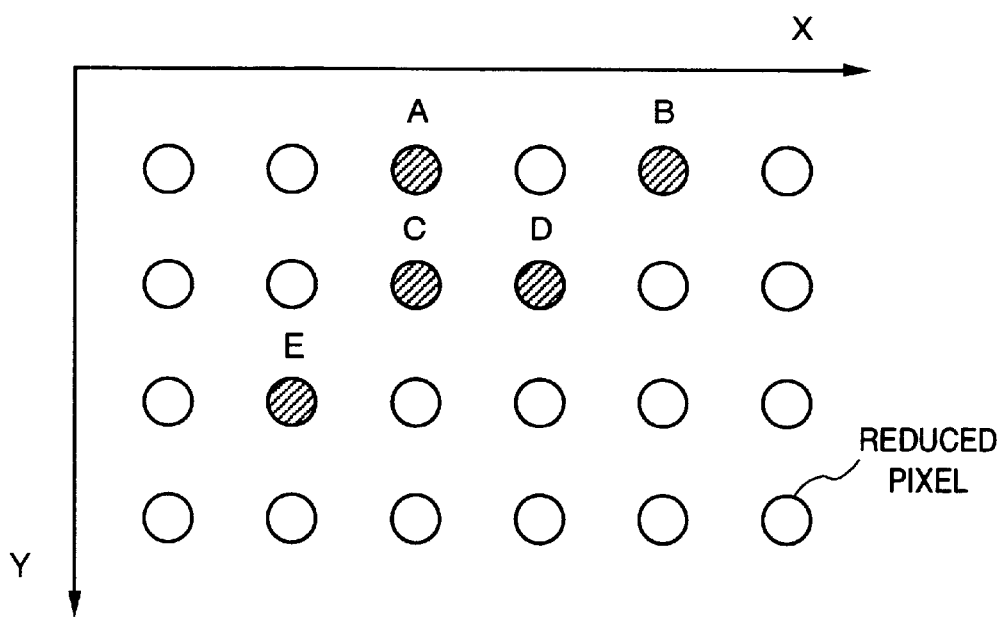
FIG. 14 is an explanatory view showing labeling according to the second embodiment.
Figure 15:
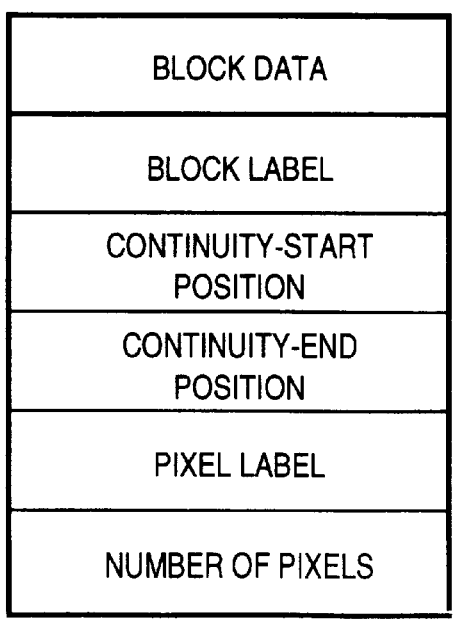
FIG. 15 is an explanatory view showing data structure of a block in the second embodiment.

In an example of FIG. 14, the header of reduced line data is accessed, and the first reduced pixel data is read in accordance with the header address stored in the header of the reduced line data. Then, the pixel data including data of pixel A is accessed. In the pixel data, the data of the pixel A is given a label "1", coordinates "(Xa, Ya)" of the pixel A are continuity-start position and continuity-end position, the number of pixels is "1", and the block label for discrimination of block attribute is "1", the same as the pixel label. Then, this pixel data is stored as block data (FIG. 15).

Then, referring to the next pixel data address, the pixel data including data of a pixel B is accessed. It is apparent that the pixel B is not connected with the pixel A in the leftward direction (and there is no connection from the upper direction since this is the first line). In the pixel data, the data of the pixel B is given "2", coordinates "(Xb, Yb)" of the pixel B are continuity-start position and continuity-end position, the number of pixels is "1", and the block label for block-attribute discrimination is "2", the same as the pixel label. Then this data is stored as block data (FIG. 15).

As the labeling on the first line has been completed, the processing is directed to the second line.

In the labeling of the second line, the header of reduced line data is accessed, and the first reduced pixel data including data of pixels C and D is accessed. As the pixel C is connected with the pixel A in the upward direction, the pixel C is given a label "1". In the block data "1", the number of pixels "1" is changed into "2", the black label "1" is not changed, and only the coordinates of the continuity-end position "(Xa, Ya)" are changed into "(Xd, Yc)" (coordinates of the pixel D) (the coordinates of the continuity-start position are not changed).

The pixel D is also connected with the pixel B in the orthogonally upward direction, accordingly, the pixel label of the pixel B is changed from "2" into "1". In the block data "1", the number of the pixels is changed from "2" into "4" (the number of pixels "2" of the block data "2" is added), the block label "1" is not changed, and only the coordinates of the continuity-end position are changed from "(Xd, Yc)" into "(Xb, Yd)" so as to include the pixels A, B, C and D. Then, the block data "2" is invalidated by changing the block label "2" into "0".

In this manner, as the labeling of the second line has been completed, the processing is directed to the third line.

In the third line, the header of reduced line data is accessed, the first black pixel E is connected with the pixel C in the orthogonally upward direction, the pixel E is given a pixel label "1". In the block data "1", the number of pixels is changed from "4" into "5", the block label "1" is not changed, and the coordinates of the continuity-start position are changed from "(Xa, Ya)" into "(Xe, Ya)", and the coordinates of the continuity-end position are changed from "(Xb, Yd)" into "(Xb, Ye)".

In this manner, the labeling and block formation are performed with respect to all the reduced pixels. As a result, the block data of a continuity of black pixels in the upward/downward or orthogonally upward/downward direction respectively have a pixel label common to all the pixels within the block, coordinates of the leftmost upward pixel as a continuity-start position, coordinates of the rightmost downward pixel as a continuity-end position, and the number of black pixels. That is, the labeling of the second embodiment is performed on reduced pixels, in substantially the same manner as the labeling of the first embodiment.

4) Step S1204

After the labeling and block formation by the labeling unit 1107, the basic attribute discriminator 1108 discriminates attributes of the blocks into figures/pictures, tables, or separators, using the width W, the height H, the area S and the number of black pixels (pixel density) D (easily obtained from calculation using block data) of a block of interest. Note that "separator" is a line that separates image areas, e.g., a document area from a picture area, or a document area from another document area. The processing by the basic attribute discriminator 1108 is the same as block-attribute discrimination of the first embodiment, therefore the explanation of the basic-attribute discrimination will be omitted. That is, the label numbers of the respective block types correspond to those in the first embodiment.

5) Step S1205

Figure 17:
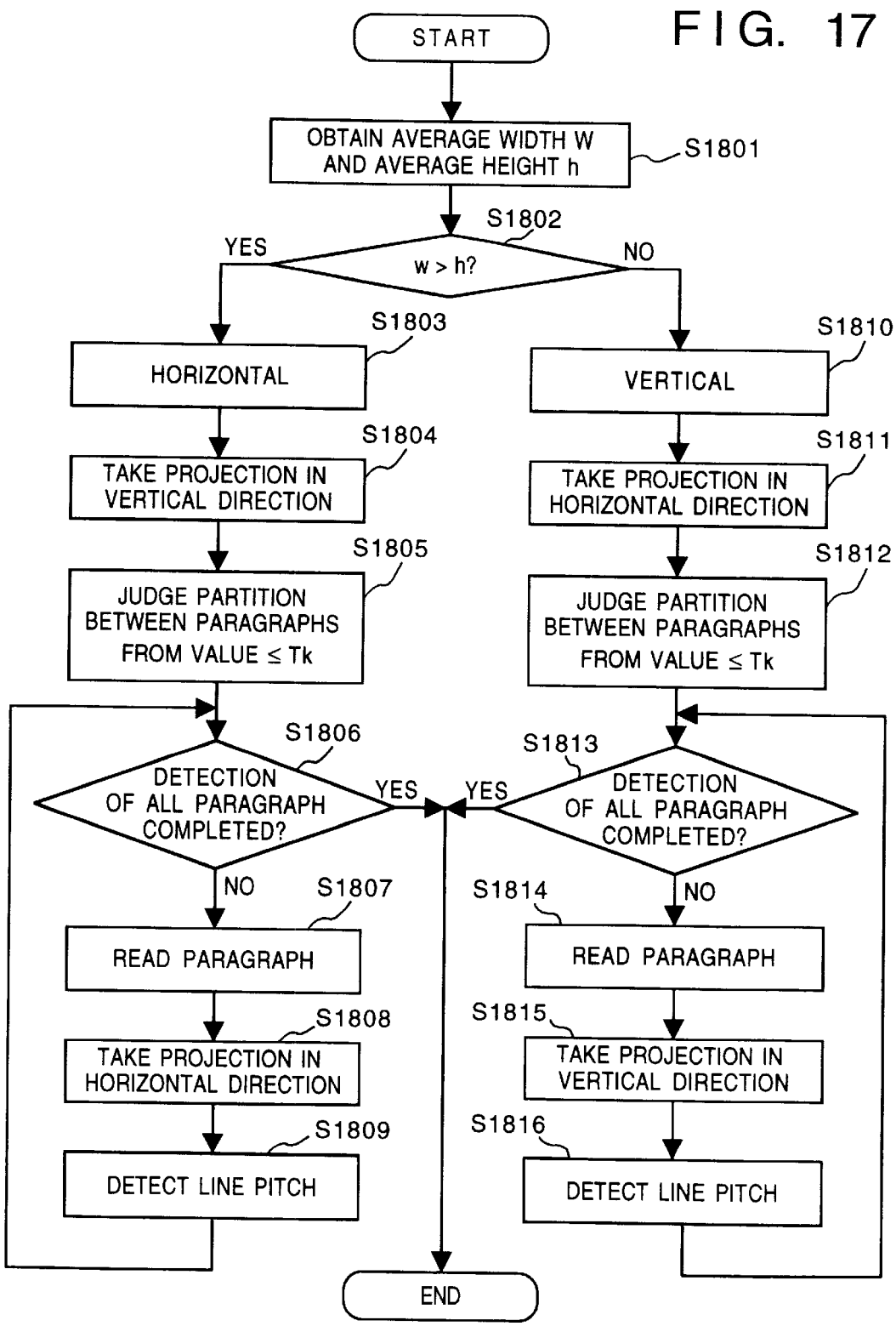
FIG. 17 is a flowchart showing document orientation detection according to the second embodiment.

Next, the operation of the orientation detector 1109 will be described with reference to the flowchart of FIG. 17. Note that the orientation detector 1109 comprises a CPU and a memory in which a program corresponding to the flowchart of FIG. 17 is stored.

If an original image includes a horizontally-written document area, blocks generated from such area usually contain black pixels arrayed in the horizontal direction, while if the original image includes a vertically-written document area, blocks generated from such area usually contain black pixels arrayed in the vertical direction.

To detect the orientation of document area, S first an average value w of the widths W and an average value h of the heights H are calculated (S1801), and if the average width w is greater than the average height h, it is determined that the orientation is horizontal, with the average height h as the font size (steps S1802 and S1803). On the other hand, if the average height h is greater than the average width w, it is determined that the orientation is vertical, with the average width w as the font size (steps S1802 and S1810).

Figure 18:
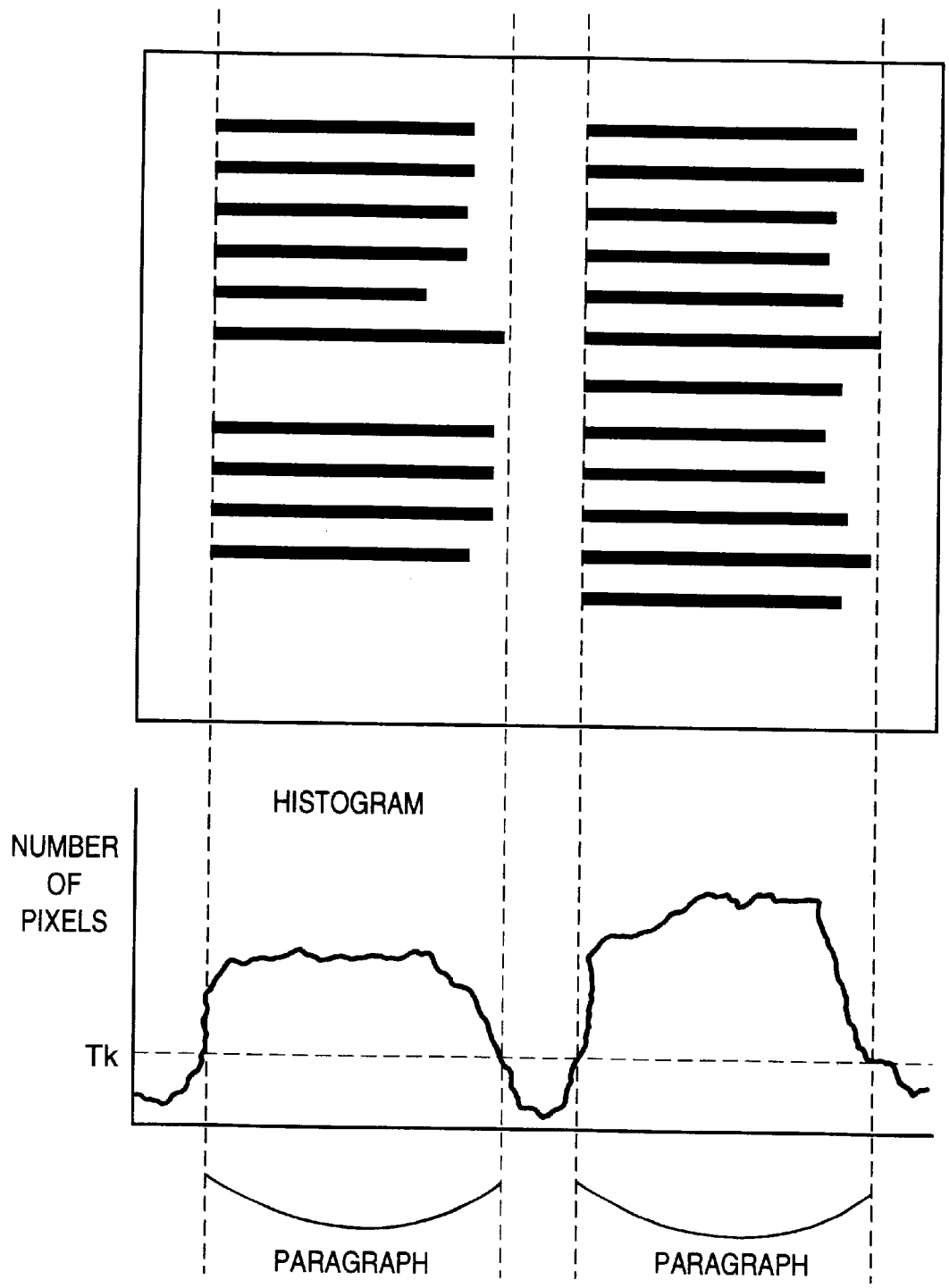
FIG. 18 is an explanatory view showing paragraph detection according to the second embodiment.

Next, a histogram of the number of black pixels is generated based on the continuities of reduced black pixels in the document blocks, in an opposite direction to the detected orientation (step S1804), and from the shape of the histogram, a portion having a value equal to a threshold value Tk or less is judged as a partition between paragraphs (steps S1805 and S1812; see FIG. 18). Further, a histogram is generated in the same direction as the orientation by each paragraph (steps S1808 and S1815), and from the shape of the histogram, the width of the continuity of black pixels is detected as font size (document-height size) in the paragraph, and the width of continuity of white pixels is detected as line pitch (steps S1809, S1816 and FIG. 17).

Since there may be more than one paragraph, this process is repeated until all the partitions between paragraphs are located. In step S1806, it is determined whether or not all the paragraphs have been processed. If YES, the process ends. If NO, a new paragraph is read in step S1807 and the same process of steps S1804 and S1805 respectively are performed in Steps S1808 and S1809. This cycle of steps S1806 to S1809 are performed until all the paragraphs have been processed.

The process performed for the horizontally oriented document is also performed for the vertically oriented document.

6) Step S1206

Figure 19:
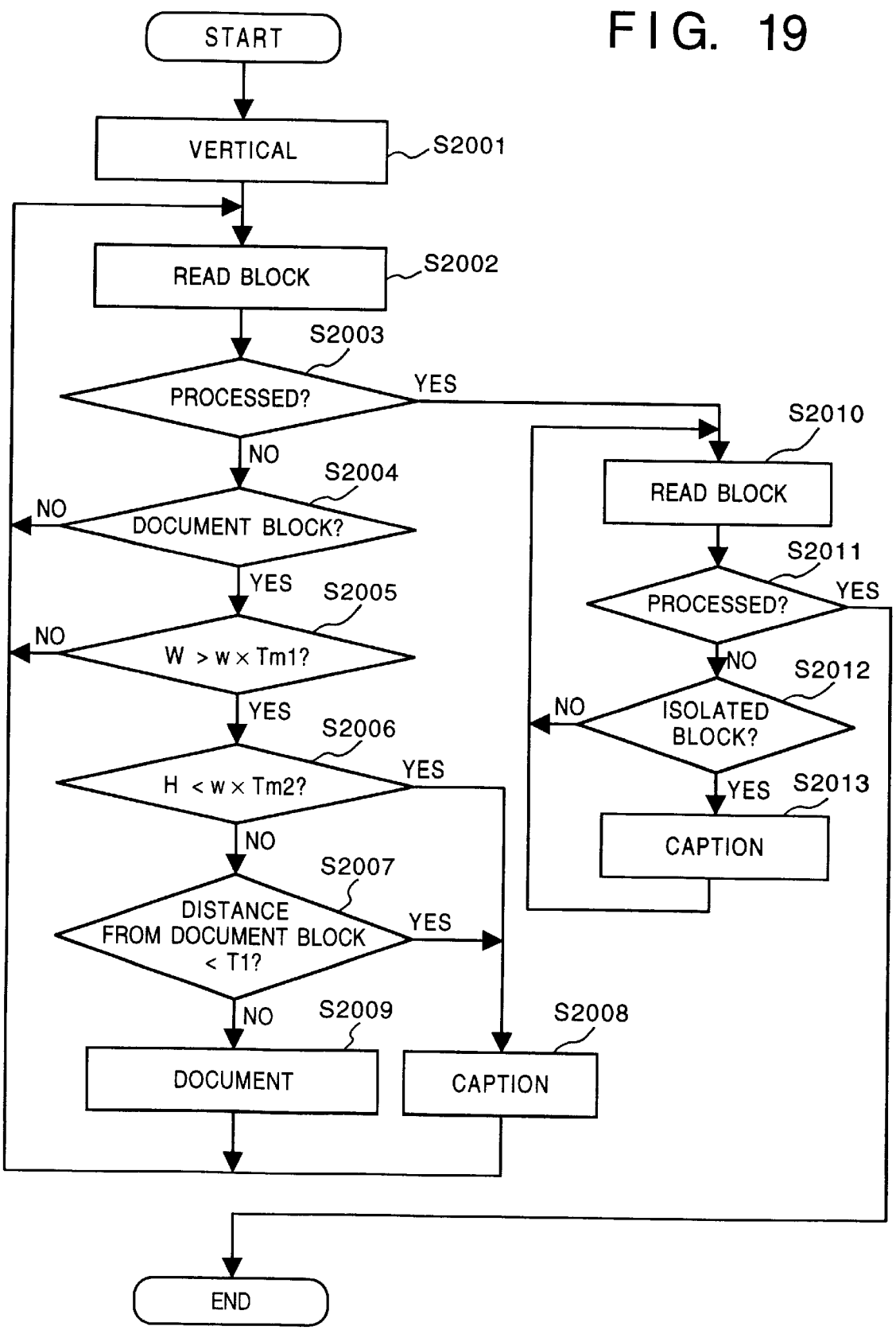
FIG. 19 is a flowchart showing caption detection according to the second embodiment.

Next, the caption detection by the caption detector 1110 will be described with reference to the flowchart of FIG. 19. The caption detector 1110 detects captions based on the orientation and the font size. In this example, the caption detection is made only for vertically-oriented document. However, it will be easily understood the processing in case of horizontally-oriented document from the following description.

First, a block where the width W equals to the font size w×a font-size threshold value Tm1 or greater (W>m×Tm1) is detected as a candidate for a caption block (step S2005).

Further, if the height H is less than the font size w×a font-size threshold value Tm2 (H<w×Tm2, step S2006), there is a possibility that the block contains vertically connected documents. Then, the caption block candidate, having a distance from a document block less than a distance threshold T1 (step S2007), is determined as document block (step S2009).

Further, an isolated block, i.e., there is no document or caption block within the range of the font size w, is detected as a caption block, from the remaining document blocks (S2010 to S2013).

Note that in case of vertically-oriented document, the above processing is made in a 90° rotated direction.

7) Step S1207

Next, the processing by the block combiner 1111 will be described below.

The block combiner 1111 combines document blocks and also combines caption blocks.

Again referring to FIG. 9, the blocks A1 and B are combined in the processing according to this embodiment. The imaginary block A1' is formed by expanding the block A1 by the amount Px in the direction X and by the amount Py in the direction Y, and whether the block A1' touches or partially/entirely includes any block is searched. In FIG. 9, as the block B is partially included in the block A1', the blocks A1 and B are combined as the new block A2. The block data of the block A1 is updated, and the block B data is invalidated. Note that the amounts Px and Py are obtained from the font size and the line pitch. If a new block formed by combining blocks touches a figure block, a table block or a separator block, the combination is invalidated, and the initial blocks are maintained.

8) Step S1208

Finally, the output unit 1104 outputs the block data of the various image areas with the image data.

As described above, the present embodiment changes the number of dots per one pixel in accordance with the resolution of the input image, links black-pixel runlength in a main-scanning direction and stores the linkage such that header addresses of respective data are stored in line header area of respective line data storage, thus performs image reduction. This attains (1) reduction of labeling processing time; (2) reduction of storage area; and (3) improvement of area-based dividing on an image having a complicated area structure.

As described above, the second embodiment enables high-speed and memory saving image-area judgment It should be noted that the present invention may forward the output data to further processings, e.g., document recognition, and if a picture image area is found, processing by an error diffusion method can be performed.

In the basic-attribute discrimination, the respective threshold values are not fixed values; they are determined in accordance with the resolution of input image data.

Upon image inputting in step S1201 of FIG. 13, discrimination on whether or not input image data is multi-value (color) image data may be performed, and if the input image data is multi-value data, the image data is converted into binary image data. This enables area-based dividing even if input image data is multi-value data.

In step S1202, if the number of pixels of input image is small enough, the image reduction processing may be omitted (skipped).

In the basic-attribute detection in step S1204, more detailed block attribution classification can be made by discriminating block labels based on, e.g., direction of separator block arrangement (i.e., whether it is horizontal or vertical) and threshold values, which are different dependent upon block attribute.

Also in step S1204, the basic-attribute discrimination can be omitted by designating a specific attribute in advance. For example, if image data has a specific attribute, e.g., an original image has only a document image area, the attribute discrimination is necessary.

Upon orientation detection in step S1205, the orientation can be detected by obtaining maximum value of the widths w and that of the heights h, instead of obtaining average width w and average height h.

Also in step S1205, if orientation detection is confirmed by paragraph, even an image that is a mixture of vertically-written document and horizontally-written document can be properly processed.

Also in step S1205, if the orientation of document to be inputted is fixed, the orientation can be a fixed value (designated from the operation panel (not shown)), and the orientation detection can be omitted in this case.

Upon caption detection in step S1206, if an image having no caption has been inputted, the caption detection can be omitted. In this case, this absence of caption is informed from the operation panel.

Figure 20:
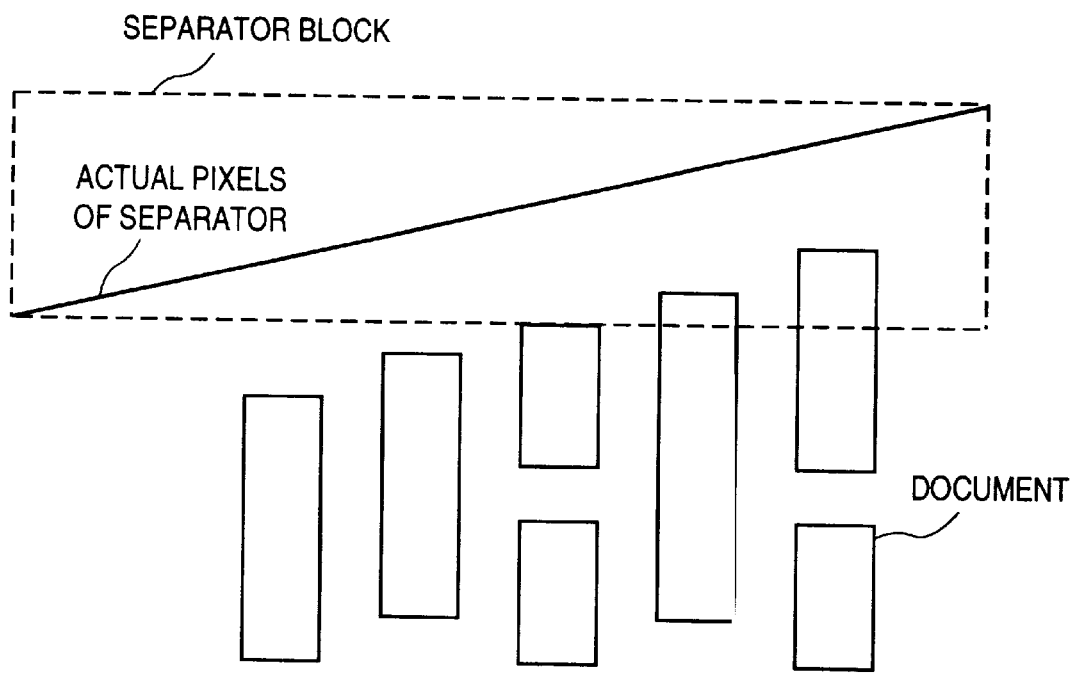
FIG. 20 is an explanatory view showing separator-block combining processing according to another embodiment of the present invention.

Further, the block combining in step S1207 can be performed even on a slanted image, as shown in FIG. 20. In this example, in a case where document blocks are in contact or partially/entirely included in a separator block, whether or not the document blocks contact actual reduced pixels is examined. If the document blocks do not contact the reduced pixels, the blocks are combined.

Upon outputting in step S1208, only necessary image data (corresponding to original image area) may be outputted by referring to block data of various areas. This further reduces memory area and processing time. For example, if input image data is outputted to a document recognition device, only image data judged as document data may be outputted to the recognition device. Note that a position in an original image can be easily obtained from a reduced pixel position. That is, if a reduced pixel is corresponding to an M×N pixel area of an original image, the reduced pixel position (X, Y) is multiplied by M and N.

Accordingly, the image processing apparatus of the embodiments input image data, and may output only image data of desired attribute.

In the above embodiments, the units of the area divider 105/1105 respectively have a CPU to perform independent processing, however, one CPU may perform the overall apparatus.

As described above, the present invention enables high-speed and memory-saving image-area discrimination.

The present invention can be applied to a system constituted by a plurality of devices or to an apparatus comprising a single device.

Furthermore, the invention is applicable also to a case where the invention is embodied by supplying a program to a system or apparatus. In this case, a storage medium, storing a program according to the invention constitutes the invention. The system or apparatus installed with the program read form the medium realizes the functions according to the invention.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus capable of detecting a separator in a document image, comprising:

formation means for forming block areas, that each contain a single or plural connected black pixels, in the document image, and for generating block data corresponding to each respective block area, the block data corresponding to each block area including position data of the respective block area;

extraction means for extracting block areas that have a block area size smaller than a predetermined size, from the block areas formed by said formation means, and for turning on an identification flag in the block data corresponding to each of the extracted block areas;

combining means for combining a first block area having block data in which the identification flag is turned on and a second block area having block data in which the identification flag is turned on, if said first and second block areas exist within a predetermined range determined based on a distance between adjacent characters, and generating new block data, in which the identification flag is turned on, corresponding to the new block area; and judgment means for judging whether or not a block area having block data in which the identification flag is turned on is a separator block area based on a shape of the new block area.

2. The image processing apparatus according to claim 1, wherein if a new block area formed by said combining means includes a part or whole other block area having block data in which the identification flag is turned on, said combining means combines the new block area and the other block area.

3. The image processing apparatus according to claim 1, further comprising discrimination means for discriminating the type of each block area, based on the size, the shape and the number of black pixels, in the block area.

4. The image processing apparatus according to claim 1, further comprising reduction means for reducing the image data by converting m×n pixels into one pixel which is a logical sum of values of the m×n pixels, prior to formation of block areas by said formation means, wherein the image data is reduced to 1/m×1/n of its original size, and m and n are integers selected to obtain a desired amount of reduction.

5. The image processing apparatus according to claim 1, further comprising:

judgment means for judging whether the image data is multi-value image data or not; and conversion means for, if said judgment means judges that the image data is multi-value image data, converting the image data into binary image data.

6. The image processing apparatus according to claim 1, further comprising elimination means for, if said judgment means judges that the new block area obtained by said combining means is not a separator block area, eliminating the new block area as noise.

7. An image processing method capable of detecting a separator in a document image, comprising:

a formation step of forming block areas, that each contain a single or plural connected black pixels, in the document image, and of generating block data corresponding to each respective block area, the block data corresponding to each block area including position data of the respective block area;

an extraction step of extracting block areas that have a block area size smaller than a predetermined size, from the block areas formed in said formation step, and of turning on an identification flag in the block data corresponding to each of the extracted block areas;

a combining step of combining a first block area having block data in which the identification flag is turned on and a second block area having block data in which the identification flag is turned on, if said first and second block areas exist within a predetermined range determined based on a distance between adjacent characters, and generating new block data, in which the identification flag is turned on, corresponding to the new block area; and a judgment step of judging whether or not a block area having block data in which the identification flag is turned on is a separator block area, based on a shape of the new block area.

8. The image processing method according to claim 7, wherein if a new block area formed by said combining step includes a part or whole other block area having block data in which the identification flag is turned on, the new block area and the other block area are combined in said combining step.

9. The image processing method according to claim 7, further comprising a discrimination step of discriminating the type of each block area, based on the size, the shape and the number of black pixels, in the block area.

10. The image processing method according to claim 7, further comprising a reduction step of reducing the image data by converting m×n pixel data into one-pixel data which is a logical sum of the m×n pixel data, prior to formation of block areas in said formation step, wherein the image data is reduced to 1/m×1/n of its original size and m and n are integers selected to obtain a desired amount of reduction.

11. The image processing method according to claim 7, further comprising:

a judgment step of judging whether the image data is multi-value image data or not; and a conversion step of, if it is judged in said judgment step that the image data is multi-value image data, converting the image data into binary image data.

12. The image processing method according to claim 7, further comprising an elimination step of, if it is judged in said judgment step that the new block area obtained by said combining means is not a separator block area, eliminating the new block area as noise.

13. A computer program product comprising a computer readable medium having computer program codes, for executing image data processing for detecting a separator in a document image by an image processing apparatus, said product including:

formation process procedure codes for executing processing for forming block areas, that each contain a single or plural connected black pixels, in the document image, and for generating block data corresponding to each of the respective block areas, the block data corresponding to each block area including position data of the respective block area;

extraction process procedure codes for executing processing for extracting block areas that have a block area size smaller than a predetermined size, from the block areas formed by said formation process procedure codes, and for turning on an identification flag in the block data corresponding to each of the extracted block areas;

combining process procedure codes for combining a first block area having block data in which the identification flag is turned on and a second block area having block data in which the identification flag is turned on, if said first and second block areas exist within a predetermined range determined based on a distance between adjacent characters, and generating new block data, in which the identification flag is turned on, corresponding to the new block area; and judgment process procedure codes for executing processing for judging whether or not a block area having block data in which the identification flag is turned on is a separator block area, based on a shape of the new block area.

* * * * *

UNITED STATES PATENT AND TRADEMARK OFFICE
CERTIFICATE OF CORRECTION

PATENT NO. : 5,966,455

DATED : October 12, 1999

INVENTOR(S): KAZUYUKI SAITO

It is certified that error appears in the above-identified patent and that said Letters Patent is hereby corrected as shown below:

COLUMN 1

Line 52, "increase" should read --increased--.

COLUMN 2

Line 10, "dividing" should read --dividing.--.

COLUMN 3

Line 30, "enables" should read --enabling--.
    Line 66, "discrimination" should read --discriminates the--.

COLUMN 4

Line 45, "a" should be deleted.

COLUMN 5

Line 30, "an" should read --a--.

UNITED STATES PATENT AND TRADEMARK OFFICE
CERTIFICATE OF CORRECTION

PATENT NO. : 5,966,455

DATED : October 12, 1999

INVENTOR(S): KAZUYUKI SAITO

It is certified that error appears in the above-identified patent and that said Letters Patent is hereby corrected as shown below:

COLUMN 6

Line 59, "this labeling" should read --when labeling--.

COLUMN 7

Line 50, "an" should read --a--.
    Line 54, "of" should read --is-

COLUMN 8

Line 61, "the B" should read --B--;

COLUMN 10

Line 48, "CPU 102" should read --CPU 1102--.
    Line 61, "unit 103." should read --unit 1103.--.

UNITED STATES PATENT AND TRADEMARK OFFICE
CERTIFICATE OF CORRECTION

PATENT NO. : 5,966,455

DATED : October 12, 1999

INVENTOR(S): KAZUYUKI SAITO

It is certified that error appears in the above-identified patent and that said Letters Patent is hereby corrected as shown below:

COLUMN 11

Line 23, "x-coordinates" should read --x-coordinate--.

COLUMN 14

Line 30, "judgment" should read --judgment.--.

Signed and Sealed this

Twenty-sixth Day of September, 2000

Attest:

Q. TODD DICKINSON

*Attesting Officer*    *Director of Patents and Trademarks*